(12) United States Patent
Aoyama (10) Patent No.: US 11,467,107 B2
(45) Date of Patent: Oct. 11, 2022

(54) X-RAY ANALYSIS APPARATUS AND X-RAY GENERATION UNIT

(71) Applicant: HORIBA, LTD., Kyoto (JP)

(72) Inventor: Tomoki Aoyama, Kyoto (JP)

(73) Assignee: HORIBA, LTD., Kyoto (JP)

( * ) Notice: Subject to any disclaimer, the term of this patent is extended or adjusted under 35 U.S.C. 154(b) by 0 days.

(21) Appl. No.: 17/287,696

(22) PCT Filed: Aug. 27, 2019

(86) PCT No.: PCT/JP2019/033399
§ 371 (c)(1),
(2) Date: Apr. 22, 2021

(87) PCT Pub. No.: WO2020/084890
PCT Pub. Date: Apr. 30, 2020

(65) Prior Publication Data
US 2021/0389262 A1      Dec. 16, 2021

(30) Foreign Application Priority Data
Oct. 25, 2018   (JP) .............................. JP2018-201221

(51) Int. Cl.
*G01N 23/2252* (2018.01)
*G01N 23/223* (2006.01)

(52) U.S. Cl.
CPC ....... *G01N 23/2252* (2013.01); *G01N 23/223* (2013.01); *G01N 2223/079* (2013.01); *G01N 2223/204* (2013.01); *G01N 2223/316* (2013.01)

(58) Field of Classification Search
CPC ....... G01N 2223/076; G01N 2223/079; G01N 2223/204; G01N 2223/316; G01N 23/223;
(Continued)

(56) References Cited

U.S. PATENT DOCUMENTS 4,519,092 A * 5/1985 Albert ...................... G21K 7/00
                                                                378/45
5,857,008 A * 1/1999 Reinhold ................ H01J 35/24
                                                                378/126
(Continued)

FOREIGN PATENT DOCUMENTS

JP      H05-273400 A    10/1993
JP      H08-247971 A     9/1996
(Continued)

OTHER PUBLICATIONS

PCT, International Search Report for the corresponding patent application No. PCT/JP2019/033399, dated Nov. 19, 2019, with English translation.

*Primary Examiner* — Dani Fox
*Assistant Examiner* — Soorena Kefayati
(74) *Attorney, Agent, or Firm* — Lucas & Mercanti, LLP (57) ABSTRACT

The X-ray analysis apparatus contains an X-ray generation unit. The X-ray generation unit includes a target plate having a target that is irradiated with an electron beam from an electron beam source and generates X-rays, X-ray convergence optics that converges X-rays generated from the target in conjunction with a movement of the target plate, and a driving unit that changes a position of the target plate or the X-ray convergence optics relative to the electron beam source.

11 Claims, 5 Drawing Sheets

(58) Field of Classification Search
CPC ........ G01N 23/2252; G21K 1/06; G21K 7/00; H01J 2235/10; H01J 35/116
See application file for complete search history.

(56) References Cited

U.S. PATENT DOCUMENTS

| | | | | |
|---|---|---|---|---|
| 2002/0064253 A1* | 5/2002 | Gutman | ................... | H01J 35/00 378/143 |
| 2004/0016559 A1* | 1/2004 | Radley | ..................... | G21K 1/06 174/28 |
| 2011/0051895 A1* | 3/2011 | Vogtmeier | ........... | A61B 6/4021 378/92 |
| 2011/0317814 A1* | 12/2011 | Verman | ................... | G21K 1/04 378/85 |
| 2013/0279652 A1* | 10/2013 | Nambu | ................ | G01N 23/083 378/53 |
| 2014/0161233 A1* | 6/2014 | Ollinger | ................ | H01J 35/153 378/205 |
| 2016/0202193 A1* | 7/2016 | Hench | .............. | G01N 23/20008 702/85 |
| 2017/0162287 A1* | 6/2017 | Waldschläger | .. | G01N 23/20008 |
| 2019/0011379 A1* | 1/2019 | Yun | ........................ | H01J 35/12 |
| 2019/0115184 A1* | 4/2019 | Zalubovsky | ............ | H01J 35/10 |
| 2019/0137422 A1* | 5/2019 | Waldschlager | ...... | G01N 23/223 |
| 2019/0187077 A1* | 6/2019 | Lee | ................... | H01L 21/67288 |
| 2019/0212281 A1* | 7/2019 | Shchegrov | ........... | G01N 23/223 |
| 2020/0058462 A1* | 2/2020 | Suzuki | ................... | H01J 35/24 |

FOREIGN PATENT DOCUMENTS

| | | |
|---|---|---|
| JP | 2002-071586 A | 3/2002 |
| JP | 2002-328102 A | 11/2002 |
| JP | 2004-093511 A | 3/2004 |
| JP | 2005-512288 A | 4/2005 |
| JP | 2008-268105 A | 11/2008 |
| JP | 2010-266368 A | 11/2010 |
| JP | 2011-520233 A | 7/2011 |

* cited by examiner

X-RAY ANALYSIS APPARATUS AND X-RAY GENERATION UNIT

CROSS REFERENCE TO RELATED APPLICATION

This Application is a 371 of PCT/JP2019/033399 filed on Aug. 27, 2019 which, in turn, claimed the priority of Japanese Patent Application No. 2018-201221 filed on Oct. 25, 2018, both applications are incorporated herein by reference.

FIELD

The present disclosure relates to an X-ray analysis apparatus and an X-ray generation unit.

BACKGROUND

For various applications of research and development such as development of materials or an investigation of a living body, or quality control such as analysis of foreign bodies or fault analysis, an X-ray analysis apparatus has been used that irradiates a sample with X-rays and detects X-ray fluorescence released from the sample, transmitted X-rays that passes through the sample and diffracted X-rays to thereby analyze the internal composition of the sample and the crystal structure of the sample.

Japanese Patent Application Laid-Open No. 2004-93511 discloses an X-ray analysis apparatus using an X-ray guide tube such as a mono-capillary or a poly-capillary as X-ray convergence optics for converging X-rays to irradiate a sample on a stage with the X-rays.

SUMMARY

Conventionally, however, the inside of the X-ray tube needs to remain under a vacuum, while a high voltage power supply is required to produce thermal electrons by an electron gun.

This upsizes the X-ray tube, which makes scanning difficult. The X-ray analysis apparatus using the conventional X-ray tube thus performs mapping or the like by moving a stage of a sample station for placing a sample, which involves movement of the mechanical parts of the stage, taking much time for movement.

The present disclosure is made in view of such circumstances, and an object is to provide an X-ray analysis apparatus and an X-ray generation unit that can shorten the scanning time.

The X-ray analysis apparatus according to the present disclosure comprises an X-ray generation unit, and the X-ray generation unit includes a target plate having a target that is irradiated with an electron beam from an electron beam source and generates X-rays, X-ray convergence optics that converges X-rays generated from the target in conjunction with a movement of the target plate, a driving unit that changes a position of the target plate or the X-ray convergence optics relative to the electron beam source, a stage mounted with a to-be-irradiated object irradiated with X-rays generated by the X-ray generation unit, and an X-ray detection unit that detects X-ray fluorescence released from the to-be-irradiated object.

The X-ray generation unit according to the present disclosure comprises a target plate having a target that is irradiated with an electron beam from an electron beam source and generates X-rays, X-ray convergence optics that converges X-rays generated from the target in conjunction with a movement of the target plate, and a driving unit that changes a position of the target plate or the X-ray convergence optics relative to the electron beam source.

The X-ray generation unit comprises the target plate having a target that is irradiated with an electron beam from the electron beam source and generates X-rays and the X-ray convergence optics that converges X-rays generated from the target in conjunction with a movement of the target plate. The target includes a heavy metal, for example, rhodium, tungsten, molybdenum or the like and can generate X-rays by excitation due to a collision with the electrons and bremsstrahlung.

The driving unit changes a position of the target plate or the X-ray convergence optics relative to the electron beam source. That is, the driving unit changes the position of the target plate relative to the electron beam source, whereby the position of the X-ray convergence optics in conjunction with the movement of the target plate is changed, so that the focal position of the X-rays converged by the X-ray convergence optics can be moved on the to-be-irradiated object longitudinally and laterally. Alternatively, the driving unit changes the position of the X-ray convergence optics relative to the electron beam source, whereby the position of the target plate in conjunction with the movement of the X-ray convergence optics is changed, so that the focal position of the X-rays converged by the X-ray convergence optics can be moved on the to-be-irradiated object longitudinally and laterally. Thus, in comparison with the conventional case where the stage composed of mechanically large components is moved in the X-axis direction and the Y-axis direction, the focal spot of X-rays can scan the to-be-irradiated object by merely changing the orientation of the target plate and the X-ray convergence optics that are reduced in size and weight, which shortens the scanning time.

The X-ray analysis apparatus comprises a stage mounted with a to-be-irradiated object irradiated with the X-rays generated by the X-ray generation unit, and an X-ray detection unit that detects X-ray fluorescence released from the to-be-irradiated object. The to-be-irradiated object can be analyzed based on the X-ray fluorescence (secondary X-rays) detected by the X-ray detection unit.

In the X-ray analysis apparatus according to the present disclosure, by the driving unit rotatively driving the target plate, the X-rays converged by the X-ray convergence optics longitudinally and transversely scan a plane orthogonal to a direction of the X-rays.

By the driving unit rotatively driving the target plate, the X-rays converged by the X-ray convergence optics longitudinally and transversely scans a plane orthogonal to the direction of the X-rays. This makes it possible to increase the scanning speed to thereby increase the speed of acquiring a mapping image, resulting in improvement in analysis processing speed.

The X-ray analysis apparatus according to the present disclosure further comprises X-ray optics provided between the target plate and the X-ray convergence optics for collimating X-rays generated from the target.

The X-ray optics for collimating the X-rays generated from the target is provided between the target plate and the X-ray convergence optics. The X-ray optics guides the X-rays generated by the target plate to the X-ray convergence optics. This makes it possible to accurately converge the X-rays generated by the target plate to the X-ray convergence optics.

In the X-ray analysis apparatus according to the present disclosure, the X-ray convergence optics is a Fresnel zone plate.

The X-ray convergence optics is a Fresnel zone plate. The Fresnel zone plate is, for example, a plate composed of concentric zones that are disposed to alternate between transparent and opaque and are spaced so as to be narrower at the radially outward zones from the center of the concentric circles. The Fresnel zone plate functions as an unequally-spaced transmission grating that more deflects the X rays that impinge on the outward zones. The Fresnel zone plate can converges the X-rays down to substantially 0.1 μm to several tens of nm of the focal spot size and can thus reduce the focal spot size. Moreover, the Fresnel zone plate can be miniaturized in comparison with the X-ray guide tube and can thus easily pivot about the support.

According to the present disclosure, it is possible to shorten the scanning time.

The above and further objects and features of the invention will more fully be apparent from the following detailed description with accompanying drawings.

Figure 1:
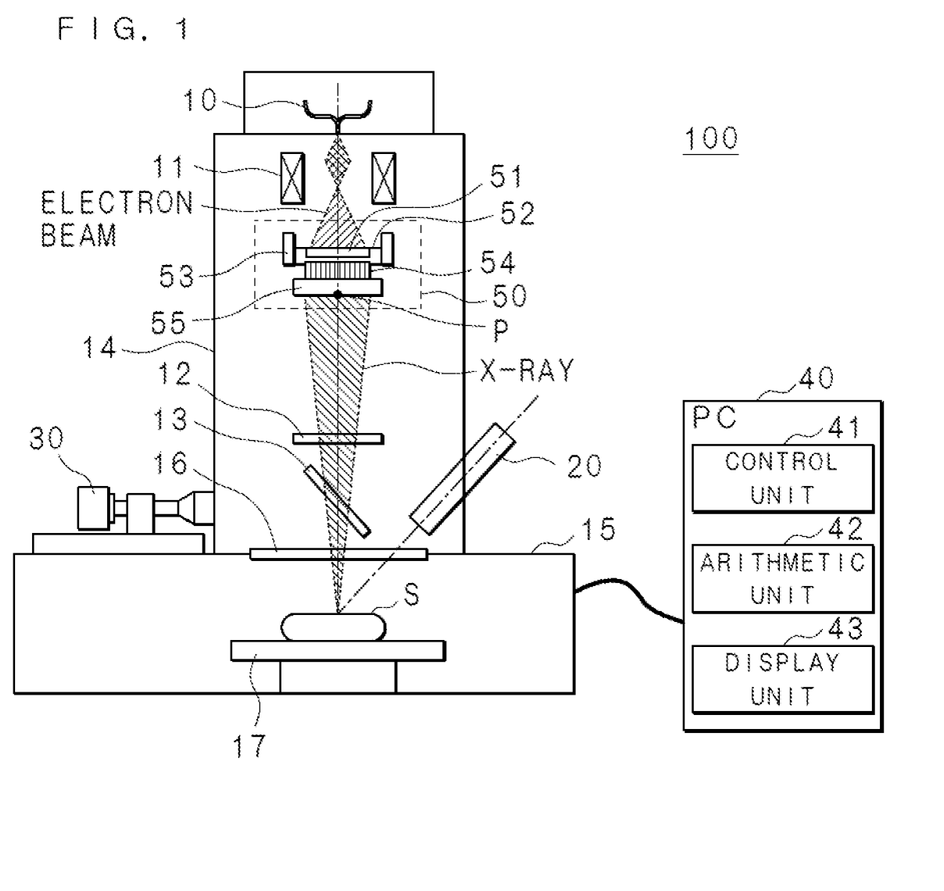
FIG. 1 is a schematic view illustrating one example of the configuration of an X-ray analysis apparatus according to a present embodiment.

The present disclosure will be described below with reference to the drawings depicting embodiments. FIG. 1 is a schematic view illustrating one example of the configuration of an X-ray analysis apparatus 100 according to a present embodiment. The X-ray analysis apparatus 100 includes an optical system storage unit 14, a sample storage unit 15 and an imaging unit 30. It is noted that the X-ray analysis apparatus 100 may include a PC 40. An X-ray transmission window 16 is provided between the optical system storage unit 14 and the sample storage unit 15. An electron beam source 10 and an X-ray generation unit 50 are kept at a depressurized state. The sample storage unit 15 may be the atmosphere or may be placed in a depressurized state in order to prevent attenuation, etc. of X-ray fluorescence (secondary X-rays) released from a sample S (to-be-irradiated object). Alternatively, the optical system storage unit 14 and the sample storage unit 15 may be provided in the same storage unit. distribution.

The optical storage unit 14 stores the electron beam source 10, an electron beam control unit 11, the X-ray generation unit 50, an energy filter 12, a mirror 13, a part of an X-ray detection unit 20, etc. The X-ray generation unit 50 includes a target plate 52, a capillary plate 54 as X-ray optics, a Fresnel zone plate 55 as X-ray convergence optics, a driving unit 53, etc. The target plate 52 has one surface on which a target 51 is deposited.

In the sample storage unit 15, a stage 17 for placing a sample S is disposed. At one side of the upper part of the sample storage unit 15, the imaging unit 30 is disposed. The imaging unit 30 is an optical camera, an optical microscope or the like.

The PC 40, which includes a control unit 41, an arithmetic unit 42 and a display unit 43, controls the processing in the X-ray analysis apparatus 100.

The electron beam source 10 is an electron gun and is provided with a filament including tungsten, for example. When current passing through the filament heats the filament, electrons (thermal electrons) are released from the filament.

The electron beam control unit 11 includes an anode, a deflecting coil and an electron lens that is composed of a convergent lens and an objective lens, etc. The electron beam control unit 11 changes the direction of travel of the electrons released from the electron beam source 10 and accelerates the electrons toward the target 51. It is noted that the electron beam control unit 11 is not an essential configuration.

The target 51 includes a heavy metal, for example, such as rhodium, tungsten, molybdenum or the like and can generate X-rays by excitation due to a collision with the electrons and bremsstrahlung.

The target plate 52 can be made of a light element material such as beryllium, diamond, graphite or the like and dissipate heat from the target 51 as a heat source. Alternatively, the target plate 52 may be coated with a material having a high reflectivity of infrared rays in order to reduce radiant heat. Alternatively, a heat dissipating sheet may be provided between the target plate 52 and the capillary plate 54. Though the shape of the target plate 52 when viewed from plan can be, not limited to, circular, it may be rectangular, for example. The following description is made assuming that the shape is circular.

The capillary plate 54 is so configured that multiple capillaries each having an optical axis in a direction orthogonal to the surface of a circular plate are arranged in a honeycomb form on the plate, for example. The capillary plate 54 can be made of glass material, for example. The X-rays generated from the target 51 positioned directly above the capillary plate 54 pass through the target plate 52, are incident to the input side of the capillary plate 54, totally reflected inside each capillary and exit in parallel from the output side thereof. Thus, the X-rays generated from the target 51 can be collimated and then be made incident to the Fresnel zone plate 55. In other words, the capillary plate 54 is an element for leading the X-rays generated by the target plate 52 to the Fresnel zone plate 55.

The Fresnel zone plate 55 employs diffraction phenomena while X-ray convergence optics such as a mono-capillary employs reflection. Due to the use of diffraction phenomena and reflection, if the incident angle of X-rays to the X-ray convergence optics changes, the X-rays cannot accurately be converged. In the present embodiment, however, the capillary plate 54 as X-ray optics for collimating X-rays is provided between the target plate 52 and the Fresnel zone plate 55 (X-ray convergence optics). Thus, even if the X-ray generation unit 50 pivots, for example, the incident angle of X-rays between the target plate 52 and the Fresnel zone plate 55 remains unchanged, and thus the X-rays can accurately be converged.

The Fresnel zone plate 55 is, for example, a plate composed of concentric zones that are disposed to alternate between transparent and opaque and are spaced so as to be narrower at the radially outward zones from the center of the concentric circles. The Fresnel zone plate 55 functions as an unequally-spaced transmission grating that more deflects the X rays that impinge on the outward zones. The Fresnel zone plate 55 has a long focal length (for example, 500 mm, 800 mm, etc.) depending on the energy of X-rays, so that the Fresnel zone plate 55 (X-ray generation unit 50) pivots about a predetermined support to thereby quickly move the focal position of the X-rays. The Fresnel zone plate 55 can converge the X-rays down to substantially 0.1 µm to several tens nm of the focal spot size and can thus make the focal spot size smaller than that of the X-ray tube such as a mono-capillary or a poly-capillary.

The Fresnel zone plate 55 has a longer focal length than that of the X-ray guide tube such as a poly-capillary. For example, the focal length of the X-ray guide tube such as a poly-capillary is approximately 20 mm. A slight rotation of the Fresnel zone plate 55 can increase the displacement of the X-rays on the surface of a sample. This enables high-speed scanning and high-speed mapping. Furthermore, a small amount of rotational drive may be sufficient without the need for extensive movement, reducing fluctuations in the position of the X-rays. The Fresnel zone plate 55 is thinner than the X-ray guide tube such as a poly-capillary, which enables miniaturization. Thus, the Fresnel zone plate 55 is pivotable with small driving force.

The target plate 52 and the Fresnel zone plate 55 between which the capillary plate 54 is provided are integrated with each other. The integration means that the capillary plate 54 and the Fresnel zone plate 55 similarly move in conjunction with the movement of the target plate 52. More specifically, the target plate 52, the capillary plate 54 and the Fresnel zone plate 55 may be fastened by an adhesive or the like or may be fit into a frame body (not illustrated). In addition, a suitable fixing method may be used such as wrapping a tape around the target plate 52, the capillary plate 54 and the Fresnel zone plate 55. It is noted that the capillary plate 54 is not necessarily provided.

The X-ray generation unit 50 is pivotable about a predetermined support (denoted by the reference code P in FIG. 1) by the driving unit 53. In other words, the target plate 52 and the Fresnel zone plate 55 integrated with each other are made pivotable about the predetermined support P, so that the focal position of the X-rays converged by the Fresnel zone plate 55 can be moved on the sample S longitudinally and laterally. In comparison with a case where the stage composed of mechanically large components is moved longitudinally and laterally, X-rays can scan the sample S by merely rotating the X-ray generation unit 50 that is reduced in size and weight about a predetermined support, which can shorten the scanning time. It is noted that the position of the support P is not limited to the position illustrated in FIG. 1. For example, the support P may be located on the Fresnel zone plate 55. The position can suitably be determined depending on the arrangement or the like of the respective components of the apparatus.

The driving unit 53 can change the position of the target plate 52 or the Fresnel zone plate 55 relative to the electron beam source 10. For example, the driving unit 53, which includes hollow cylindrical piezoelectric elements, is fastened to the target plate 52 as well as placed near the target plate 52. Alternatively, the driving unit 53 may be fastened to the Fresnel zone plate 55. A ground electrode (OV) is provided on the entire internal surface of the piezoelectric element while multiple electrodes divided appropriately are provided on the external surface of the piezoelectric element. The piezoelectric elements can partially contract or extend by control of the voltage applied to the electrodes, which enables an oscillating motion of the target plate 52 about the support P. In correspondence with the movement of the target plate 52, the entire X-ray generation unit 50 moves similarly. Though the driving unit 53 is not limited to the piezoelectric element, the driving unit 53 may be configured essentially to pivot in the X-axis direction or in the Y-axis direction about a predetermined support and may be a two-axle rotative stage, for example.

Furthermore, the Fresnel zone plate 55 can be miniaturized in comparison with the X-ray guide tube and can thus easily pivot about a support.

The energy filter 12 can transmit X-rays with a required energy.

The mirror 13 is provided with a cutout at a portion through which X-rays pass. Alternatively, the mirror 13, which includes mirrors, may be spaced at a required interval while opposed to each other across the portion through which X-rays pass through. It is noted that the mirror 13 may be made of an X-ray transmittable material.

The X-ray detection unit 20 may include multiple X-ray detection units. When the X-ray generation unit 50 pivots by the driving unit 53, the position on the sample exposed to X-rays changes. The change of the position exposed to X-rays changes the position from which X-ray fluorescence exits, resulting in change of the distance from the position where the X-ray fluorescence is generated to the X-ray detection unit 20. Thereupon, it is more preferable that multiple X-ray detection units are provided, and it is most preferable that an annular detector is used in which multiple detection units are provided around a hole through which X-rays pass. Moreover, the analysis result may be corrected between the multiple X-ray detection units.

The control unit 41 causes the X-ray generation unit 50 to pivot about the support P by outputting a control signal to the driving unit 53. This allows the focal spot of the X-rays to move on the sample S. The control unit 41 can further control the output intensity of the X-rays by controlling the operation of the electron beam source 10 and the electron beam control unit 11. In addition, the control unit 41 can control the operation of the stage 17 and the imaging unit 30.

The arithmetic unit 42 performs analysis processing based on the strength data of a spectral line of the X-ray fluorescence detected by the X-ray detection unit 20. The control unit 41 can display the analysis result by the arithmetic unit 42 on the display unit 43. The display unit 43 can display an optical image imaged by the imaging unit 30. The imaging unit 30 is used for identifying a site to be measured on the sample, which enables X-ray irradiation at the position to be measured.

Figure 2A:
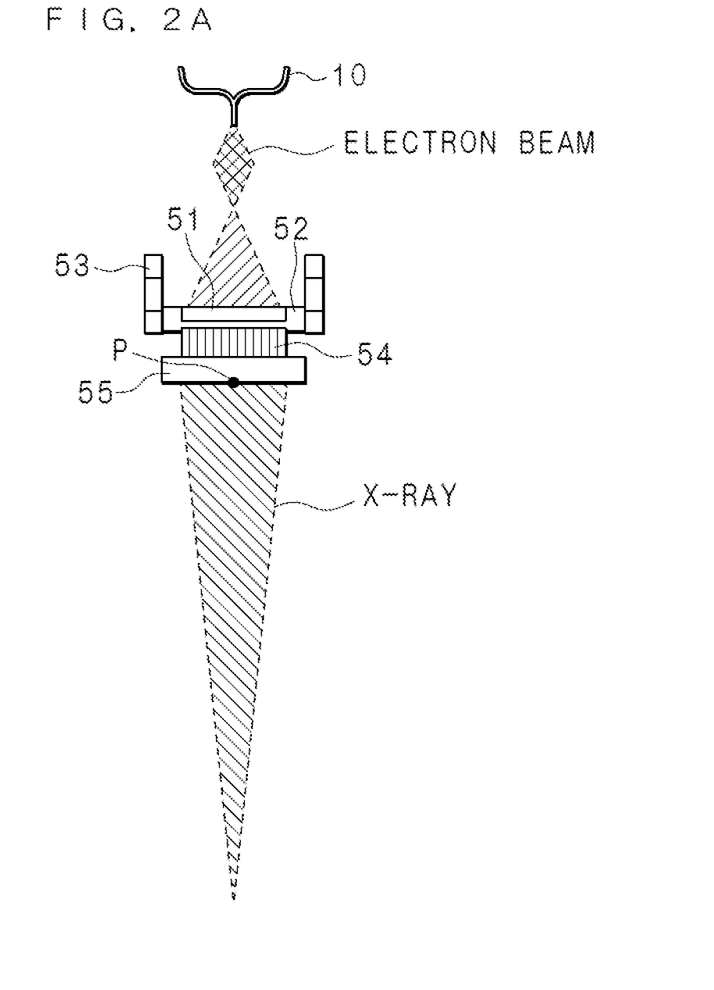
FIG. 2A is a schematic view illustrating one example of a state in which an X-ray generation unit pivots.
Figure 2B:
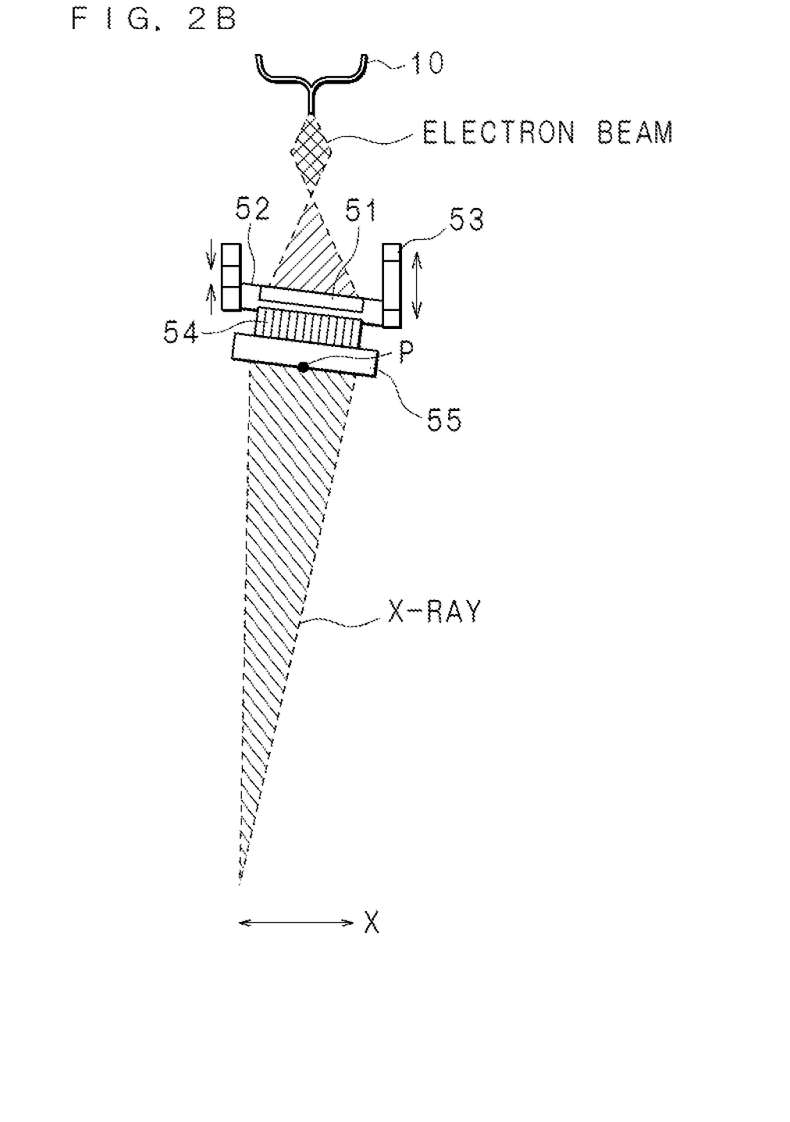
FIG. 2B is a schematic view illustrating one example of a state in which the X-ray generation unit pivots.

FIGS. 2A and 2B are schematic views each illustrating one example of a state in which the X-ray generation unit 50 pivots. FIG. 2A shows a state in which the X-ray generation unit 50 does not pivot while FIG. 2B shows a state in which the X-ray generation unit 50 pivots about an axis (axis orthogonal to the sheet of the drawing: Y axis, for example) passing through the support P, for example. Though not illustrated, the X-ray generation unit 50 can also pivot about an axis (axis parallel to the sheet of the drawing: X axis, for example) passing through the support P.

As illustrated in FIG. 2B, by controlling voltage to be applied to the respective electrodes of the piezoelectric elements positioned at one side and positioned at the other side in the X-axis direction of the piezoelectric elements of the driving unit 53, the piezoelectric element positioned at the one side in the X-axis direction contracts while the piezoelectric element positioned at the other side in the X-axis direction extends to thereby cause the X-ray generation unit 50 pivot about the support P toward the one side in the X-axis direction. Similarly, by controlling voltage to be applied to the respective electrodes positioned at one side and positioned at the other side in the X-axis direction, the piezoelectric element positioned at the one side in the X-axis direction extends while the piezoelectric element positioned at the other side in the X-axis direction contracts to thereby cause the X-ray generation unit 50 to pivot about the support P toward the other side in the X-axis direction. The same applies to pivot in the Y-axis direction.

Figure 3:
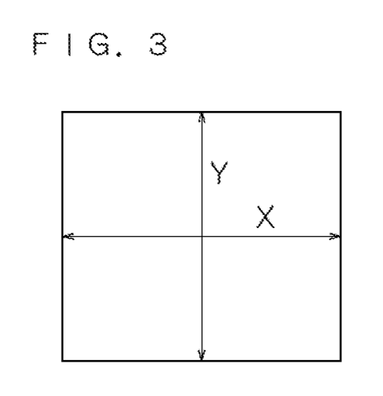
FIG. 3 is a schematic view illustrating the direction of travel of the focal position of X-rays.

FIG. 3 is a schematic view illustrating the direction of travel of the focal position of X-rays. As illustrated in FIG. 3, the X-ray generation unit 50 pivots about the support P to move the focal position of the X-rays in the X-axis direction (laterally, for example) and the Y-axis direction (longitudinally, for example).

It is noted that the X-ray generation unit 50 may pivot in a direction other than along a straight line in the X-axis direction or the Y-axis direction. The focal position of X-rays may, for example, move to draw a certain shape such as a clockwise spiral. The driving unit 53 takes charge of movement in the X-axis direction while the stage 17 takes charge of movement in the Y-axis direction, and vice versa. This makes it possible to simplify the structure of the driving unit.

As described above, in the present embodiment, the target 51 (target plate 52) as an X-ray source and the Fresnel zone plate 55 as convergence optics are configured to pivot about a predetermined support as a single unit. The X-ray generation unit 50 pivots about the support P to thereby allow the X-rays converged by the Fresnel zone plate 55 to scan longitudinally and laterally a plane orthogonal to the X-axis direction. This makes it possible to increase the scanning speed to thereby increase the speed of acquiring a mapping image, resulting in improvement in analysis processing speed.

Figure 4:
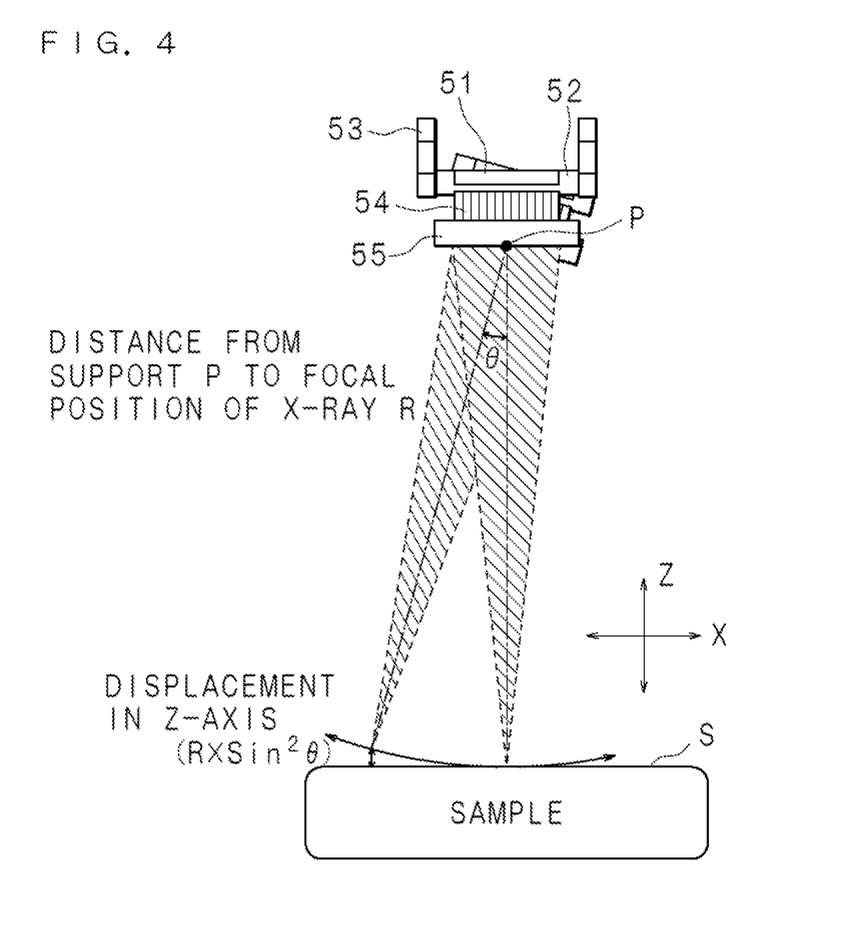
FIG. 4 is a schematic view illustrating one example of correcting the focal position of X-rays by the X-ray generation unit.

FIG. 4 is a schematic view illustrating one example of correcting the focal position of X-rays generated by the X-ray generation unit 50. As illustrated in FIG. 4, the distance from the support P to the focal position of X-rays is assumed as R while the angle of rotation of the X-ray generation unit 50 with reference to the Z-axis direction is assumed as θ. When the X-ray generation unit 50 pivots about the support P, the focal position of X-rays draws a circle on the X-Z plane as well. If the angle of rotation θ is 0, the focal position of the X-rays is on the surface of the sample S while if the angle of rotation θ is not equal to 0 (≠0), the focal position of the X-rays is displaced in the Z-axis direction by R×$sin^2$ θ. Accordingly, the driving unit 53 is moved along the Z-axis direction in correspondence with the angle of rotation θ, to thereby keep the focal position of the X-rays on the surface of the sample. Instead of moving the driving unit 53, the stage 17 may be moved along the Z-axis direction.

According to the present embodiment, by merely pivoting the X-ray generation unit 50 about the support P in the angular direction, the focal position of X-rays can be moved. In the conventional example, it takes a large amount of time to generate a mapping image (an image representing the analysis result of a sample, for example) while scanning a stage which is performed to scan the sample. Since a target object of a sample may be viewed only when the stage reaches the corresponding position, an extensive period of time is required to analyze the sample. According to the present embodiment, the scanning speed is high, which increase the speed of acquiring a mapping image. This is very effective especially for a sample that needs the speed of analysis such as inspection of foreign bodies since it enables analysis with a short time period.

It is to be noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An X-ray analysis apparatus comprising:
an X-ray generation unit,
a stage mounted with a to-be-irradiated object irradiated with X-rays generated by the X-ray generation unit, and
an X-ray detection unit that detects X-ray fluorescence released from the to-be-irradiated object,
wherein the X-ray generation unit includes
an electron beam source that generates an electron beam,
a target plate having a target that is irradiated with the electron beam generated by the electron beam source and generates X-rays,
X-ray convergence optics that converges X-rays generated from the target, and
a driving unit that causes a change of a position of the target plate relative to the electron beam source or a change of a position of the X-ray convergence optics relative to the electron beam source, wherein
the position of the X-ray convergence optics is changed in conjunction with the change in the position of the target plate caused by the driving unit, or
the position of the target plate is changed in conjunction with the change in the position of the X-ray convergence optics caused by the driving unit.

2. The X-ray analysis apparatus according to claim 1, wherein by the driving unit rotatively driving the target plate, the X-rays converged by the X-ray convergence optics longitudinally and transversely scan a plane orthogonal to a direction of the X-rays.

3. The X-ray analysis apparatus according to claim 1, further comprising X-ray optics provided between the target plate and the X-ray convergence optics for collimating X-rays generated from the target.

4. The X-ray analysis apparatus according to claim 1, wherein the X-ray convergence optics is a Fresnel zone plate.

5. The X-ray analysis apparatus according claim 1, wherein the target plate is fixed with respect to the X-ray convergence optics.

6. The X-ray analysis apparatus according to claim 2, further comprising X-ray optics provided between the target plate and the X-ray convergence optics for collimating X-rays generated from the target.

7. The X-ray analysis apparatus according to claim 2, wherein the X-ray convergence optics is a Fresnel zone plate.

8. The X-ray analysis apparatus according to claim 3, wherein the X-ray convergence optics is a Fresnel zone plate.

9. The X-ray analysis apparatus according to claim 3, wherein the target plate, the X-ray optics for collimating X-rays, and the X-ray convergence optics are fixed with respect to each other.

10. The X-ray analysis apparatus according to claim 6, wherein the X-ray convergence optics is a Fresnel zone plate.

11. An X-ray generation unit comprising:

an electron beam source that generates an electron beam;

a target plate having a target that is irradiated with the electron beam generated by the electron beam source and generates X-rays;

X-ray convergence optics that converges X-rays generated from the target; and a driving unit that causes a change of a position of the target plate relative to the electron beam source or a change of a position of the X-ray convergence optics relative to the electron beam source, wherein the position of the X-ray convergence optics is changed in conjunction with the change in the position of the target plate caused by the driving unit, or the position of the target plate is changed in conjunction with the change in the position of the X-ray convergence optics caused by the driving unit.

* * * * *